(12) United States Patent
Moshrefzadeh et al.

(10) Patent No.: US 6,624,934 B1
(45) Date of Patent: Sep. 23, 2003

(54) PROJECTION SCREEN USING VARIABLE POWER LENTICULAR LENS FOR ASYMMETRIC VIEWING ANGLE

(75) Inventors: Robert S. Moshrefzadeh, Oakdale, MN (US); John C. Nelson, The Sea Ranch, CA (US); Patrick A. Thomas, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/335,994

(22) Filed: Jun. 18, 1999

(51) Int. Cl.⁷ ................... G03B 21/56; G03B 21/60
(52) U.S. Cl. ........................ 359/457; 359/460
(58) Field of Search .................. 359/443, 452, 359/455, 456, 457, 460, 626, 619, 625

(56) References Cited

U.S. PATENT DOCUMENTS

| | | | | |
|---|---|---|---|---|
| 3,712,707 A | * | 1/1973 | Henkes, Jr. ............... | 350/122 |
| 3,791,712 A | * | 2/1974 | Miyagi .................... | 359/455 |
| 3,809,457 A | * | 5/1974 | Kurtz et al. .............. | 359/455 |
| 3,832,032 A | | 8/1974 | Shimada .................. | 350/128 |
| 4,076,384 A | | 2/1978 | Deml et al. ............... | 350/122 |
| 4,509,823 A | | 4/1985 | Moriguchi et al. ......... | 350/128 |
| 4,531,812 A | * | 7/1985 | Oguino .................... | 359/457 |
| 4,679,900 A | * | 7/1987 | McKechnie et al. ........ | 350/126 |
| 5,457,572 A | | 10/1995 | Ishii et al. ............... | 359/457 |
| 5,563,738 A | * | 10/1996 | Vance ..................... | 359/452 |
| 5,611,611 A | | 3/1997 | Ogino et al. .............. | 353/74 |
| 6,023,369 A | * | 2/2000 | Goto ...................... | 359/443 |
| 6,101,031 A | * | 8/2000 | Yoshimura et al. ........ | 359/456 |
| 6,292,294 B1 | * | 9/2001 | Takahashi et al. ......... | 359/455 |
| 6,483,612 B2 | * | 11/2002 | Walker .................... | 359/460 |

FOREIGN PATENT DOCUMENTS

| | | |
|---|---|---|
| EP | 0 783 133 A1 | 7/1997 |
| JP | 95345519 | 12/1995 |
| JP | 08254757 | 10/1996 |

* cited by examiner

*Primary Examiner*—Christopher Mahoney
(74) *Attorney, Agent, or Firm*—William D. Miller

(57) ABSTRACT

Rear projection screens use lenticular lens films as light dispersing components. A single lenticular lens film includes lenticular lenses having different focal powers, or includes lenticular lenses formed in two dimensional patterns. The lenticular lens films improve the brightness uniformity over the entire screen as viewed by a viewer who is located at a specific position. The specific position is typically selected to be the most probable location of the viewer for the particular application.

12 Claims, 11 Drawing Sheets

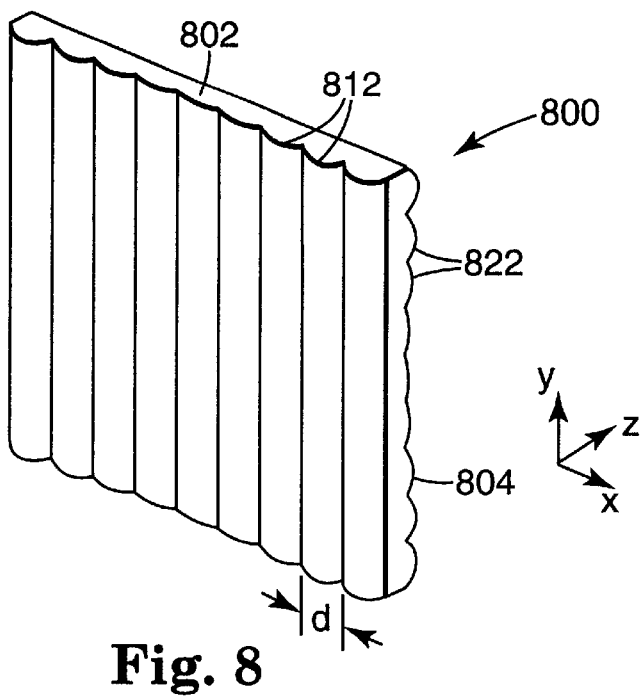
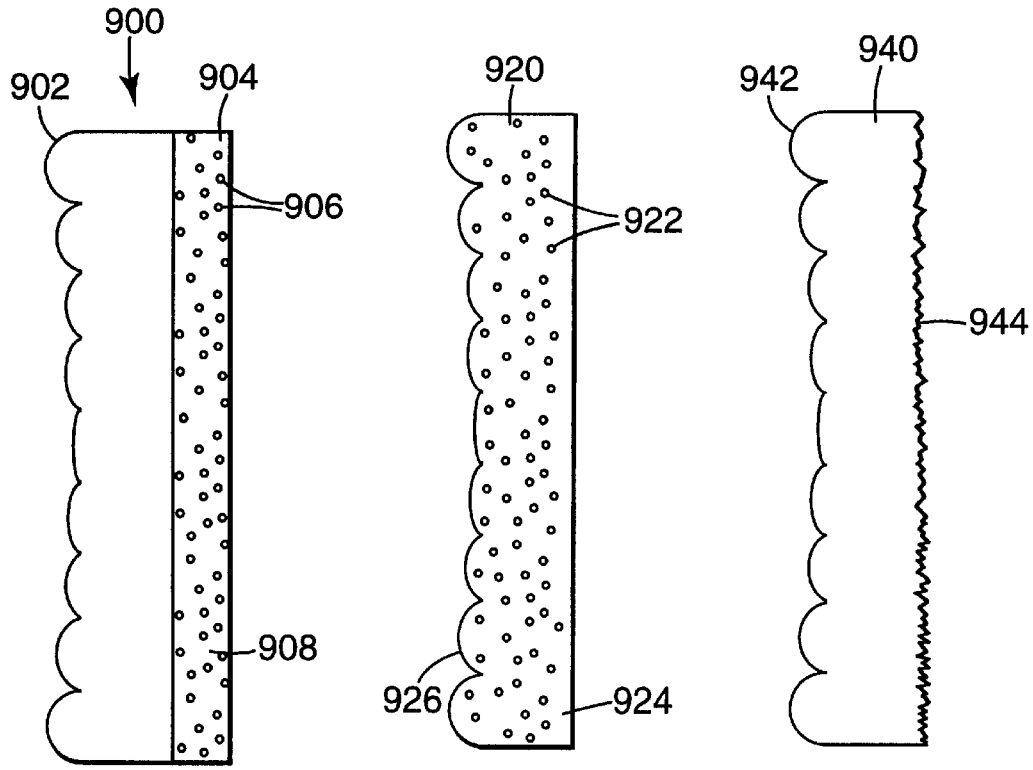
Fig. 8
Fig. 9A    Fig. 9B    Fig. 9C

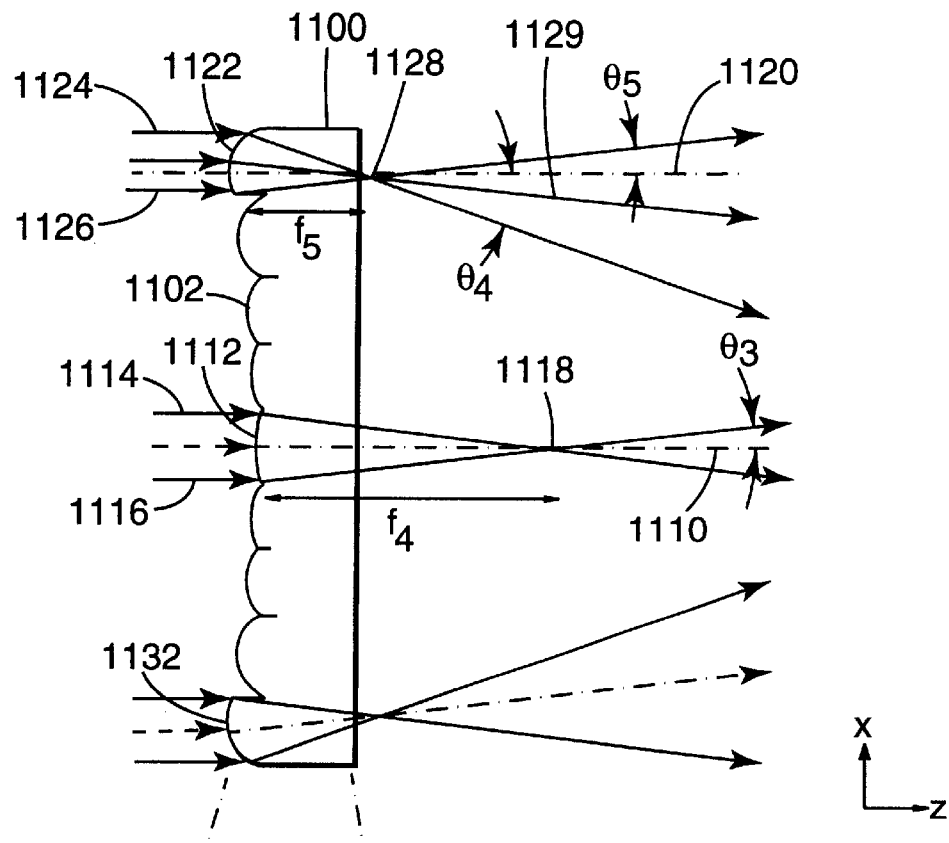
Fig. 11A
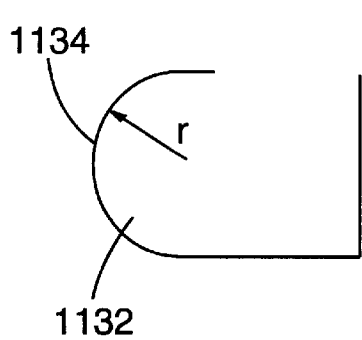 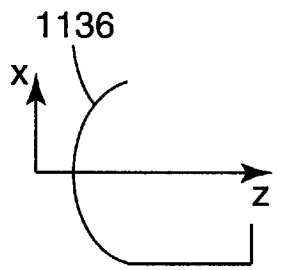 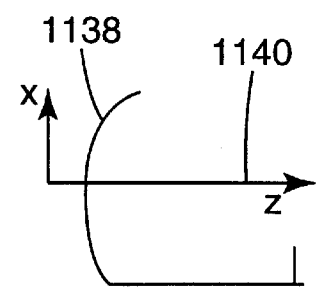
Fig. 11B  Fig. 11C  Fig. 11D

PROJECTION SCREEN USING VARIABLE POWER LENTICULAR LENS FOR ASYMMETRIC VIEWING ANGLE

BACKGROUND

This invention relates generally to transmissive screens, and more particularly to transmissive screens suitable for use in rear projection systems.

Rear projection screens are generally designed to transmit an image projected onto the rear of the screen into a viewing space. The viewing space of the projection system may be relatively large (e.g., rear projection televisions), or relatively small (e.g., rear projection data monitors). The performance of a rear projection screen can be described in terms of various characteristics of the screen. Typical screen characteristics used to describe a screen's performance include gain, viewing angle, resolution, contrast, the presence of undesirable artifacts such as color and speckle, and the like. It is generally desirable to have a rear projection screen that has high resolution, high contrast and a large gain. It is also desirable that the screen spread the light over a large viewing space. Unfortunately, as is described more fully below, as one screen characteristic is improved, one or more other screen characteristics often degrade. For example, in order to increase the screen gain using the same overall structure, the viewing angle over which the screen is readily observable is typically decreased. As a result, certain tradeoffs are made in screen characteristics and performance in order to produce a screen that has overall acceptable performance for the particular rear projection display application.

Thus, there remains a need for screens that have improved overall performance while meeting the minimum performance criteria necessary for the rear projection display application in which the screen is used.

SUMMARY

Generally, the present invention relates to rear projection screen assemblies, and particularly to rear projection screens using lenticular lens films as light dispersing components. A lenticular lens film may include lenticular lenses having different focal powers, or may include lenticular lenses formed in two dimensional patterns. The invention is intended to improve the brightness uniformity over the entire screen as viewed by a viewer who is located at a specific position. The specific position is typically selected to be the most probable location of the viewer for the particular application.

In one embodiment, the invention is a rear projection screen for use with a light source, and includes a substrate having first and second transmitting regions. A first lenticular lens pattern is on at least a portion of a first surface of the substrate to provide optical focusing power to the substrate. A first region of the lenticular lens pattern includes focusing elements having a first focal distance and a second region of the lenticular lens pattern includes focusing elements having a second focal distance different from the first focal distance.

In another embodiment, the invention is a rear projection screen, including a substrate having a first surface with a lenticular lens pattern on the first surface. Focusing elements of the first lenticular lens pattern are substantially not linear in extent on the first surface, adjacent focusing elements substantially paralleling one another to form a two-dimensional lenticular lens pattern.

In another embodiment of the invention, a screen includes first transparent light transmitting means for transmitting light, and light dispersing means disposed on at least one surface of the light transmitting means, the light dispersing means including a plurality of light focusing means for focusing light passing through the transmitting means. At least one of the light focusing means has a focal length different from a focal length of another light focusing means.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 8 illustrates a variable power lenticular lens having two, crossed lenticular patterns according to an embodiment of the present invention;

FIG. 9A illustrates a variable power lenticular lens film laminated to a bulk diffuser film according to an embodiment of the present invention;

FIG. 9B illustrates a variable power lenticular lens film incorporating bulk diffusing particles according to an embodiment of the present invention;

FIG. 9C illustrates a variable power lenticular lens film with a light dispersing surface according to an embodiment of the present invention;

FIG. 11A illustrates another variable power lenticular lens film, including lenses with off-set optical axes, according to an embodiment of the present invention;

FIGS. 11B–11D illustrate various lenticular lens cross sections;

Figure 1:
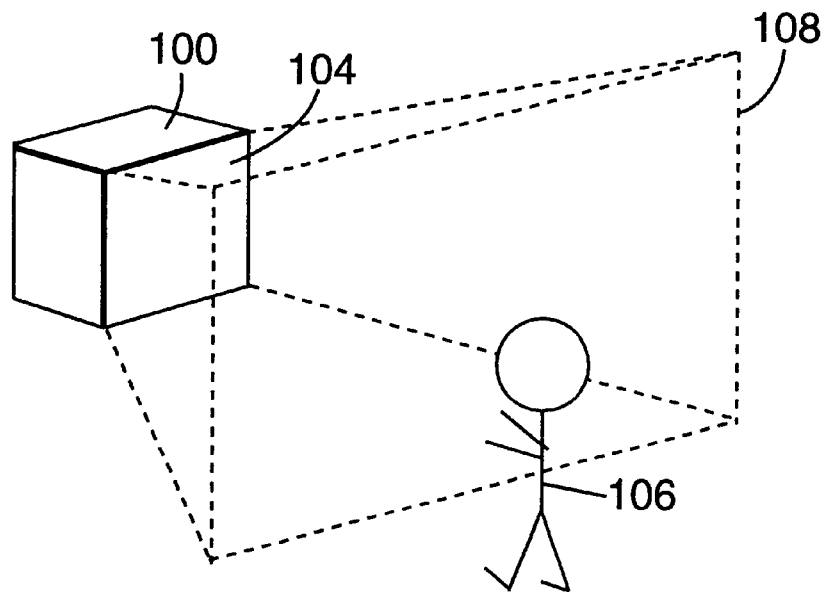
FIG. 1 illustrates a rear projection display.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally applicable to a number of different screen assemblies and is particularly suited to screen assemblies used in rear projection systems. In particular, the present invention is advantageous in applications where the most likely position of the viewer, or viewers, is known: the invention is useful in directing light from all portions of the screen to the most likely viewer position, to increase brightness uniformity across the screen.

The rear projection display 100 is described with reference to FIGS. 1, 2A and 2B 2. The display includes an image projector 102 that projects an image onto the rear side of a screen 104. The image is transmitted by the screen 104 so that a viewer 106, located at some point beyond the screen 104, can see the image 108 projected through the screen 104. The rear projection display 100 may be, for example, a rear projection television, or a rear projection computer monitor, or any other rear projection displaying apparatus.

In accordance with one embodiment of the invention, a liquid crystal display (LCD) based image projector 102 can be used in the rear projection display 100 to project an image onto the rear surface of the screen assembly 104. The rear projection display may vary in size from relatively small data monitors, to large screen televisions and video walls. The projection display 100 may also rely on a folded image projection path within its housing, such as the various projection systems described in European Patent Application EP783133, entitled "Projecting Images", the contents of which are incorporated herein by reference. As will be appreciated from the descriptions below, such systems particularly benefit from the use of the various screen assemblies described herein below.

A more detailed description of the various screen characteristics is now provided. One important screen characteristic is gain. The gain of a screen represents the screen's brightness as a function of viewing angle. The gain is typically calibrated using an ideal Lambertian reflector with the gain of the ideal Lambertian standard set at 1 for all angles. The peak gain of a screen (or screen element) corresponds to the highest gain at some angle. For example, the peak gain of a bulk diffuser screen, illuminated from behind at normal incidence, is typically observed for the light transmitted through the screen at an angle normal to the screen surface.

Another important screen characteristic is viewing angle. The viewing angle of a screen, as used herein, is the angle at which the gain of the screen drops to half of the peak gain. In many situations, the viewing angle corresponds to the angle at which the intensity of the transmitted image drops to half of the intensity of light transmitted normal to the screen surface.

The particular application of a rear projection system determines the desired viewing angle. It is typically advantageous to direct as much light as possible from the screen to the region where the viewer is most likely to be situated. For example, where the rear projection display is a data monitor, the viewer is typically positioned centrally relative to, and within approximately one to three feet from, the screen. The viewer's eyes may be positioned above a line normal to the center of the screen, but the viewer typically does not view the screen from a distance as much as one or two feet above the screen. Furthermore, for reasons of privacy or security, it may be desirable to reduce the amount of light that emerges from the screen at an angle of e.g. 30° degrees or more relative to a normal to the screen. This reduces the possibility that someone positioned far away from the axis of the screen, and perhaps having no authority to view the contents of the screen, sees the information on the screen.

Another application for a rear projection screen is in a home television system, where it is generally desired to project the image from the screen horizontally over a large angle since it is common for viewers to be seated at a position other than directly in front of the television screen. On the other hand, few viewers view the television screen from a position significantly above or below the screen, and therefore it is commonly desired to reduce the angle in the vertical direction over which the image is transmitted. Accordingly, the viewing angle for a television is typically smaller in the vertical direction than in the horizontal direction. Furthermore, the vertical divergence of the light from a television screen is preferably tilted downwards relative to a normal from the screen. This accommodates, for example, viewers watching the television from the floor. It is not as important to deflect light upwards from the television screen, since viewers typically do not stand to watch television for any length of time.

Figure 2A:
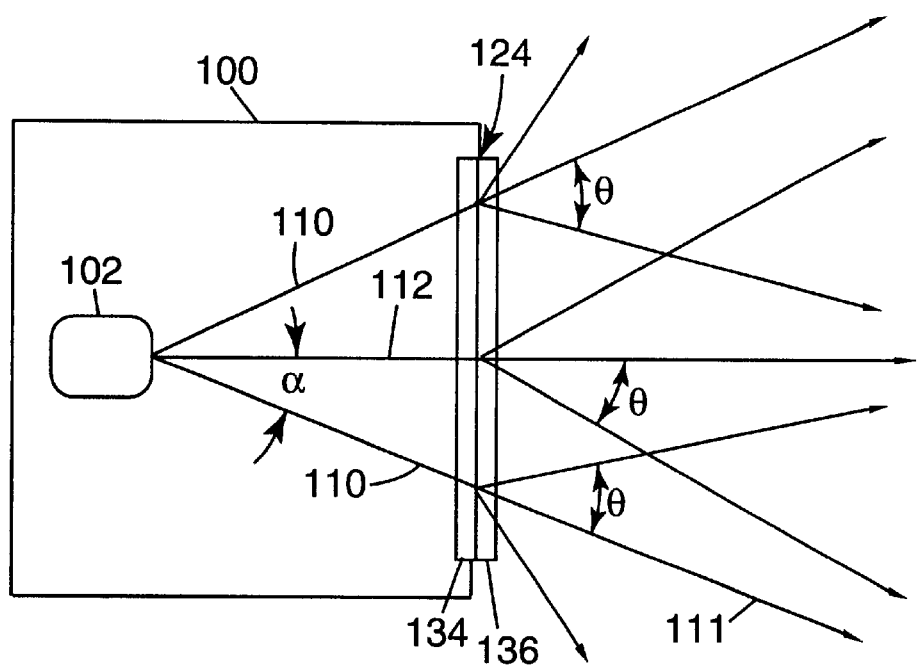
FIGS. 2A and 2B illustrate cross-sectional views of particular embodiments of rear projection displays.

Considering now the illustration of FIG. 2A, the image light 110 produced by the image projector 102 is directed to the screen assembly 124. The screen assembly 124 typically includes several different layers for controlling the image seen by the viewer, including a dispersing layer 134, or layers, and a glass plate 136 to provide support. The dispersing layer 134 disperses, or diffuses, light passing through a particular point of the screen into a cone angle, so that a viewer on the far side of the screen can detect image light from that particular point. It will be appreciated that the dispersing layer 134 typically disperses light from all points across the screen so that the viewer can see the entire image projected onto the screen assembly 124 by the image projector 102.

The on-axis ray of light 112 is dispersed by the dispersing layer 134 to produce a viewing angle of 2θ. The off-axis light rays 110 from the image projector 102 illuminate the edge of the screen assembly 124, and are separated from the on-axis ray 112 by an angle of α. When the off-axis rays 110 pass through the dispersing layer, they are dispersed by ±θ about a ray 111 that is at an angle α relative to a screen normal. It should be appreciated that the viewing angle at the edge of the screen need not be the same as the viewing angle at the center of the screen, since the light dispersing event may be sensitive to the angle of incidence of light from the image light source.

Figure 2B:
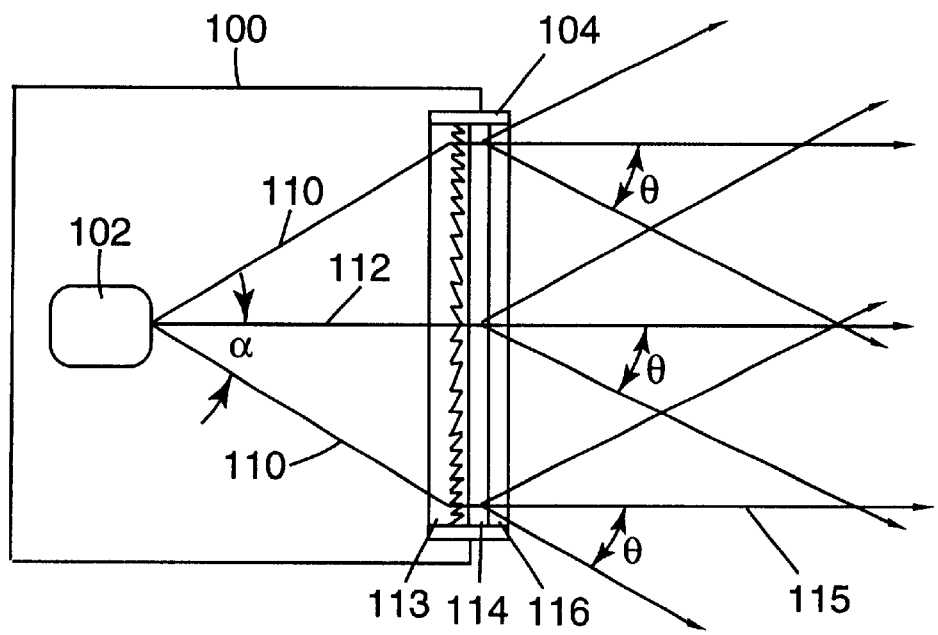

Another screen assembly 104 is illustrated in FIG. 2B, in which light 110 from the image projector 102 is collimated by a Fresnel lens 113 before being incident on the dispersing layer 114. The dispersing layer 114 is supported on a support layer 116, which may be, for example, a glass screen. In this case, the dispersed light transmitted through the edge of the screen 104 is dispersed about a ray 115 that is normal to the screen. One advantage of the screen assembly 104 over the screen assembly 124 without any Fresnel lens is that the angle through which light from the edge of the screen has to be dispersed in order to be detected by an on-axis viewer is reduced. Since the intensity of dispersed light generally decreases with increased angle of dispersion, the image seen by a viewer on the screen assembly 104 having a Fresnel lens typically appears to be more uniformly intense across the screen, than where no Fresnel lens is used.

Figure 3:
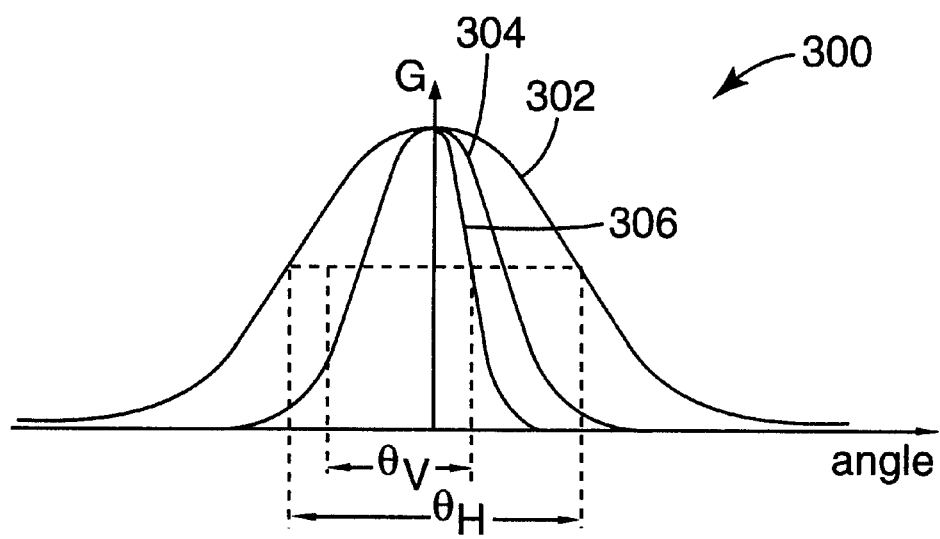
FIG. 3 shows curves of optical gain plotted against angle of view, for vertical and horizontal angles.

One example of a desired gain characteristic for a television screen is illustrated in FIG. 3. The figure illustrates two curves, 302 and 304, that relate gain to angle of viewing, θ, as might be obtained for a screen used in a television. The broader curve 302 illustrates the gain, G, as a function of angle, θ, in a horizontal direction. In other words, this describes the brightness of the screen perceived by a viewer as the viewer moves sideways away from the screen. The horizontal viewing angle, $\theta_H$, is the angle at which the intensity of the horizontally dispersed light falls to half of the on-axis intensity, or to half of the maximum intensity.

The narrower curve 304 represents the dependence of the gain as a function of angle relative to the screen in a vertical direction. As has been discussed above, it is typically desired in a television application that the image from the screen be directed vertically in a relatively narrow range of angles in order to avoid throwing away light that would otherwise illuminate the floor and ceiling, thus increasing the screen brightness perceived by the viewers. In this case, the vertical viewing angle, $\theta_v$, the dispersion angle at which the light intensity is one half of the on-axis intensity, or one half of the maximum intensity, is considerably less than the horizontal viewing angle, $\theta_H$.

Accordingly, it should be appreciated that there are several applications for rear projection display screens in which the viewing angle is not symmetric, in other words, the vertical viewing angle, $\theta_v$, is different from the horizontal viewing angle, $\theta_H$. Also, the viewing angle in one direction, for example the vertical direction, need not be a symmetric function of angle. For example, the gain in the vertical direction may fall more rapidly with increasing angle above the screen axis than for decreasing angle below the screen axis, as is shown for curve 306, which has its peak gain at θ=0°, but sheds more light downwards than upwards.

Figure 4A:
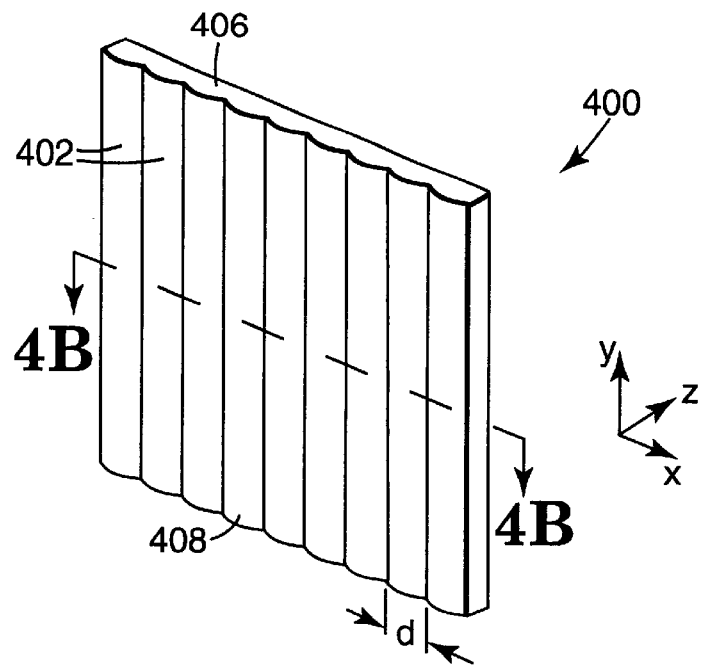
FIG. 4A illustrates one embodiment of a lenticular lens film.

The present application is directed to dispersing films for use in a screen assembly, where the dispersing film includes a lenticular lens array, typically in the form of a film. A lenticular lens array 400 is shown in schematic form in FIG. 4A. The lens 400 is formed from a number of cylindrical lenticular lenses 402 in a parallel arrangement. In this particular embodiment, each lenticular lens 402 has a width d, and extends in length from a first edge 406 of the array 400 to the other edge 408. Note the axes denoting the x-y plane as the plane of the lenticular lens array 400, and the z-direction as the major direction of propagation of light through the array 400. The x-direction may be considered as the horizontal direction and the y-direction as the vertical direction.

Figure 4B:
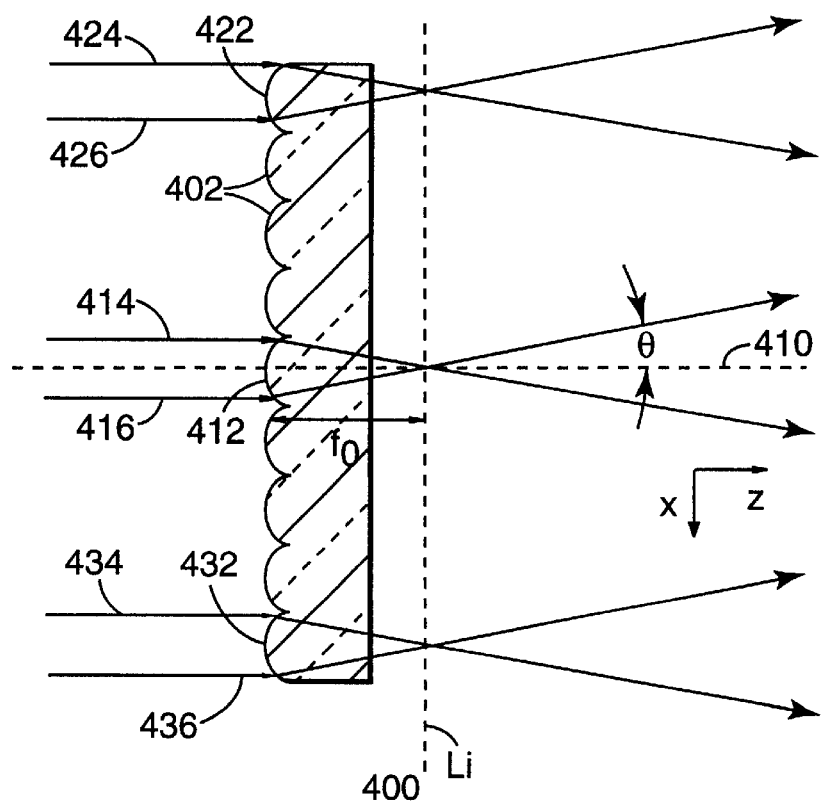
FIG. 4B illustrates a cross-section through the lenticular lens film of FIG. 4A.

A cross-section view through the lenticular lens array 400 is illustrated in FIG. 4B. The center lens 412 has an optical axis 410. Light rays 414 and 416 pass through the edges of the lens 412, are brought to a focus and then diverge at an angle θ, where $\theta \approx d/2f_0$, and $f_0$ is the focal length of the lens 412. Likewise, light rays 424 and 426 are transmitted through one end lens 422, and light rays 434 and 436 pass through the lens 432 at the other edge of the lenticular lens array 400. All of the lenses 402, 412, 422 and 432 in the array 400 have the same focal length, $f_0$, as is illustrated by the line $L_i$ drawn through the foci formed by each lens 402, 412, 422 and 432.

Such lenticular lens arrays are used in rear projection screens to disperse the light along one direction, for example the x-direction. Since dispersion of light by this embodiment of a lenticular lens array is unidirectional, two, crossed lenticular arrays may be used in order to disperse light along the x and y directions.

Figure 5A:
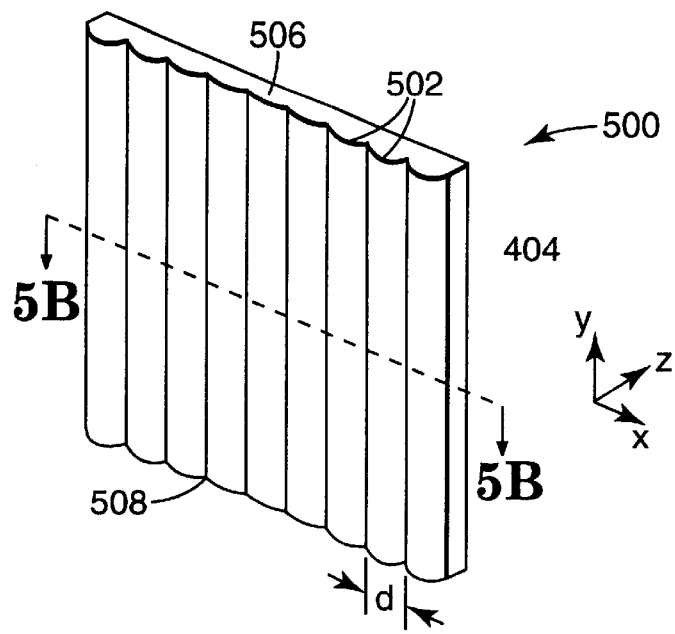
FIG. 5A illustrates a variable power lenticular lens film according to one particular embodiment of the present invention.

One particular embodiment of a variable power lenticular lens array 500 is illustrated in FIG. 5A. The array 500 includes a number of cylindrical-type lenses in a parallel arrangement. In this particular embodiment, each lenticular lens 502 has a width d, and extends from a first edge 506 of the array 500 to the other edge 508. The coordinate axes are similar to those illustrated in FIG. 4A.

Figure 5B:
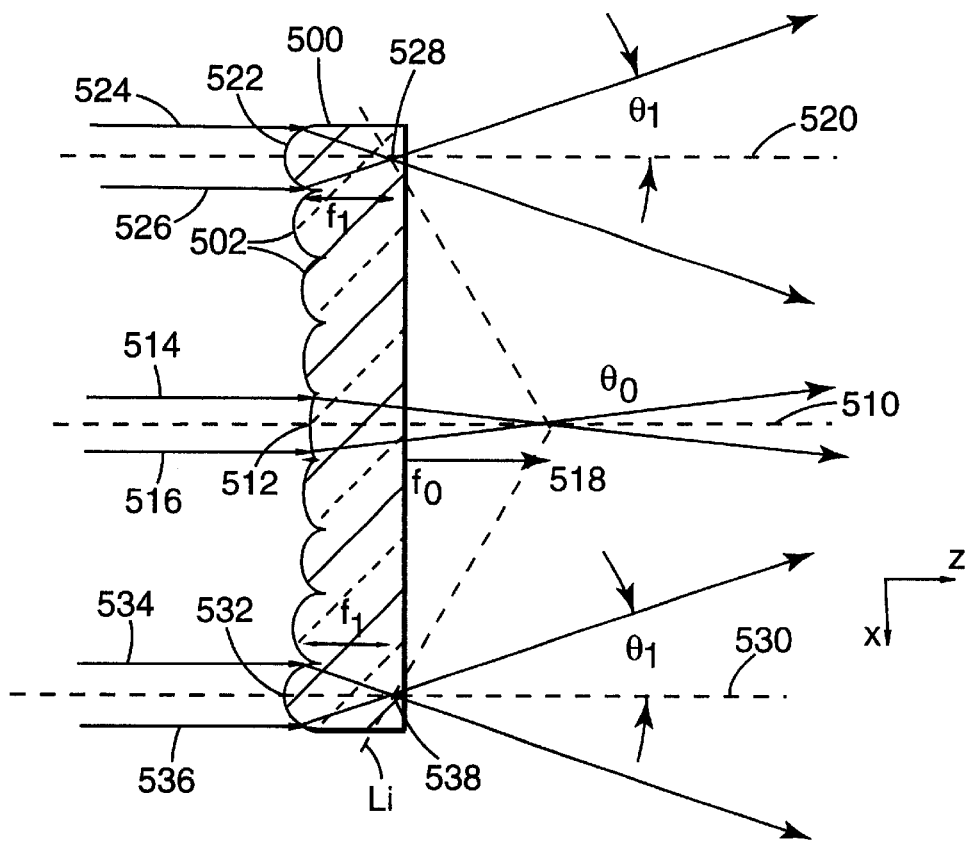
FIG. 5B illustrates a cross-section through the variable power lenticular lens film of FIG. 4A

A cross-sectional view through the lenticular lens array 500 is illustrated in FIG. 5B. The center lens 512 has an optical axis 510. Parallel light rays 514 and 516, pass through the edges of the center lens 512 and are brought to a focus 518 at a distance $f_0$ from the lens 512, where $f_0$ is the focal length of the center lens 512. The rays 514 and 516 diverge from the focus 518 at an angle $\theta_0$ relative to the optical axis 510.

The lens 522 at one end of the array 500 has an optical axis 520. Parallel light rays 524 and 526 are incident on the edge of the lens 522. The light rays 524 and 526 are brought to a focus 528 at a position separated from the lens 522 by a distance equal to the focal length, $f_1$, of the lens 522. The rays 524 and 526 each diverge away from the focus 528, at an angle $\theta_1$, relative to the optical axis 520. The lens 532 at the other edge of the array 500 also has a focal length $f_1$, and so parallel rays 534 and 536 that are incident on either edge of the lens 532 are brought to a focus 538 at a point separated from the lens 532 by the focal length $f_1$. Furthermore, the rays 534 and 536 diverge from the focus 538 at an angle of $\theta_1$ relative to the optical axes 530.

In this particular embodiment, the focal length of different lenses of the lenticular lens array 500 are different. In particular, the focal length of the center lens 512 is different from the focal lengths of the lenses 522 and 532 at the edges of the array 500. Therefore, the focusing power of the lenticular lens array 500 is dependent on the position at which light strikes the array 500. In the example shown, the locus of focal points of each lens in the array 500 is described by the line $L_i$. The line $L_i$ is positioned farthest from the array 500 for the center lens 512, and closest to the array 500 for the lenses 522 and 532 at the edges of the array. While the line $L_i$ is drawn to show that the focal length of each lens is shorter by the same amount than its more central neighbor, the focusing power of the lenses in the lenticular array may vary by different amounts. For example, the focal lengths may change between adjacent lenses by a greater amount for lenses close to the center of the array rather than close to the edge of the array: in such a case the locus line $L_i$ would have a cusp at the center lens 512.

Figure 5C:
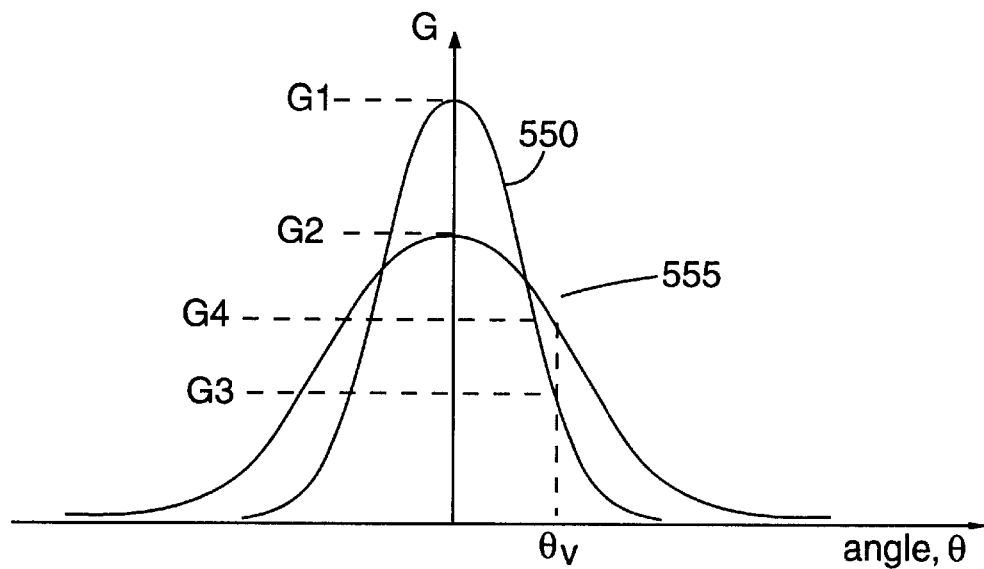
FIG. 5C illustrates viewing angles for various portions of the variable power lenticular lens illustrated in FIGS. 5A and 5B.

The lenticular lens provides advantages to the screen designer because the amount of light dispersion afforded by the screen may be selected to be different for different portions of the screen. Therefore, for example, the designer is able to design a screen to have greater light dispersion at the edges than at the center, in order to increase the amount of light reaching a viewer centered on the screen. This may be particularly important since, as was noted earlier, the gain typically falls off for greater dispersion angles. Consider the gain curves illustrated in FIG. 5C. The first curve 550 illustrates the gain of the edge portion of the screen if the focal power is the same as at the center of the screen. The brightness of the edge of the screen seen by the viewer aligned with screen center is given by the gain at $\theta_v$, since the viewer views the edge of the screen at an angle of $\theta_v$. When the dispersion angle for the edge portions of the screen is increased by using a higher focusing power, the on-axis ($\theta$=0°) gain of the edge of the screen is reduced from G1 to G2, but the amount of light reaching the viewer at an angle of $\theta_v$ is increased from G3 to G4.

The divergence of light at the edge of the screen may also be increased by using lenticular lenses that are larger in width than d, sometimes referred to as variable pitch lenticular lenses. The introduction of a variable pitch across a lenticular lens, such as the use of lenticular lenses of larger width, may reduce the resolution of the screen. The use of a variable power lenticular lens, with uniform pitch, allows the same resolution to be maintained across the screen while having different dispersion angles at selected areas of the screen.

Figure 6:
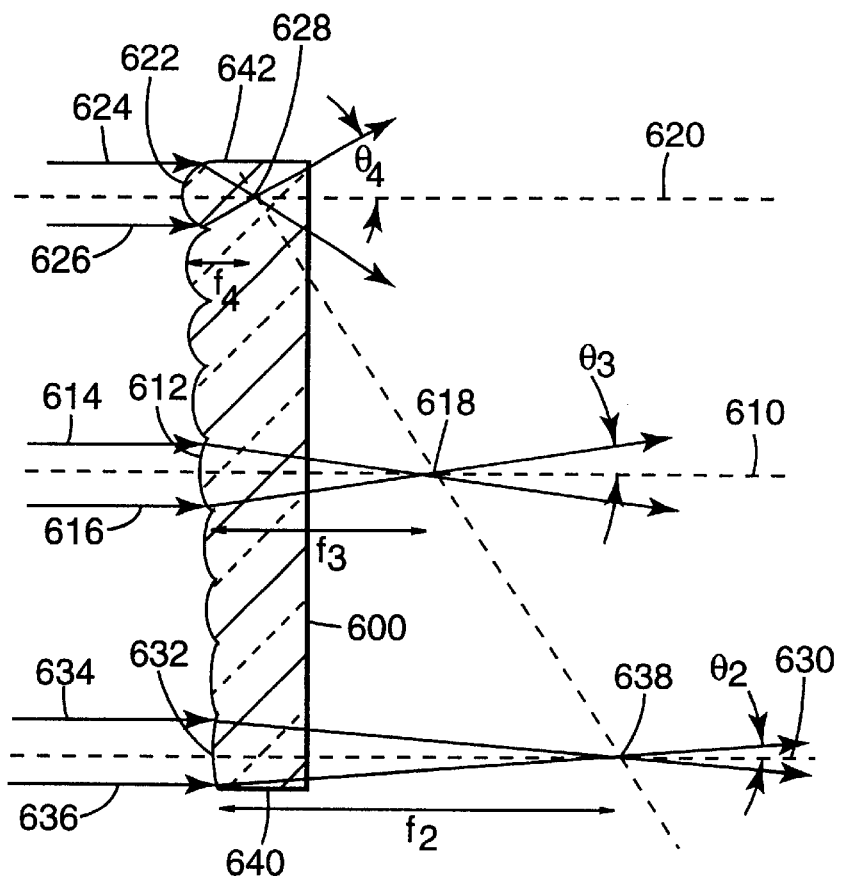
FIG. 6 illustrates another variable power lenticular lens film according to another embodiment of the present invention.

Another embodiment of a variable power lenticular lens array is illustrated in FIG. 6. Here, the array 600 has a lens 632 at one edge of the array 600 having a focal length of $f_2$. Light rays 634 and 636 focused through the edges of lens 632 diverge from the focus 638 at an angle $\theta_2$ relative to the optical axis 630. The array 600 has a centrally located lens 612 with a focal length of $f_3$. Light rays 614 and 616 focused through the edges of lens 612 diverge from the focus 618 at an angle $\theta_3$ relative to the optical axis 610. A third lens 622 at the other edge of the array 600 has a focal length $f_4$. Light rays 624 and 626 focused through the edges of lens 622 diverge from the focus 628 at an angle $\theta_4$ relative to the optical axis 620. In this case, the locus line, $L_i$, shows that the focal length of the lenses in the array 600 decreases continually from the first edge 640 to the other edge 642.

The variation in focal length across the lenticular lens array 600 need not be linear or regular, but may take on some other characteristic. For example, the variation in focal length across the array 600 may be peak at some place between the edges, or may come to a minimum value between the edges, rather than having the minimum value at the edge. There may be many different types of focal power variation across the lenticular lens array, some examples of which are illustrated in FIGS. 7A–7D. These figures represent the lenticular lens array film as a rectangle, and show the locus of focal points, $L_i$, as a function of position across the film.

Figure 7A:
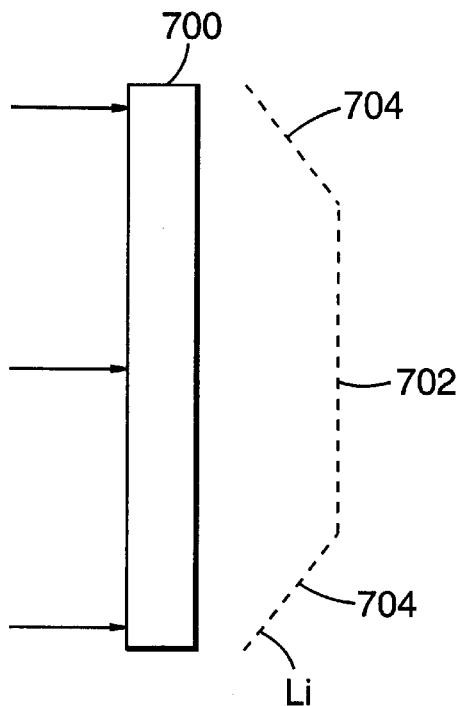
FIGS. 7A–7D schematically illustrate variable power lenticular lenses having different locus lines, according to different embodiments of the present invention.
Figure 7B:
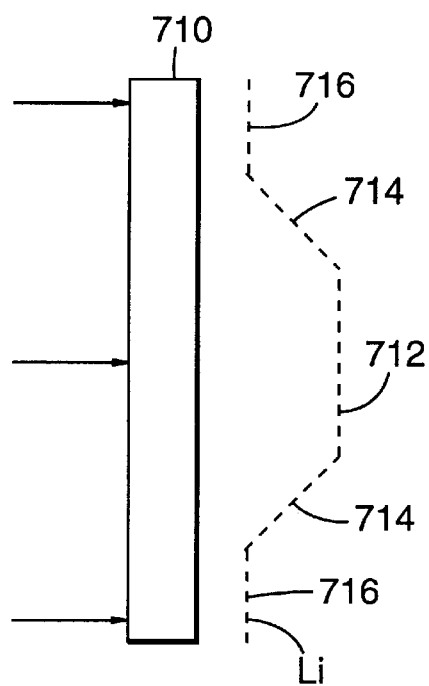
Figure 7C:
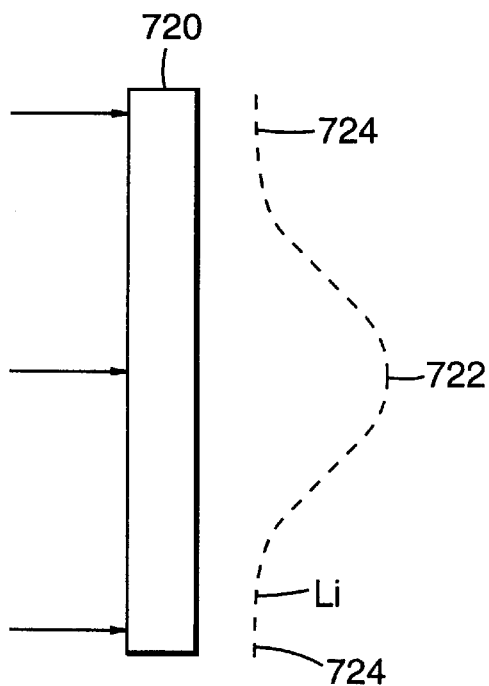
Figure 7D:
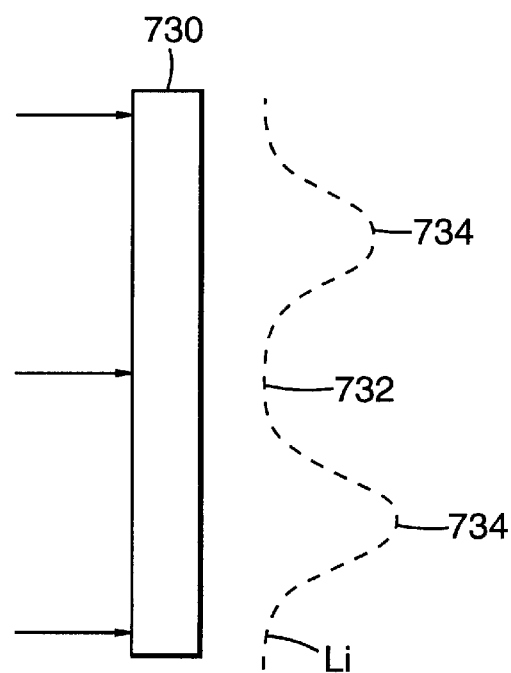

In FIG. 7A, the locus $L_i$ has a flat central portion 702, and the focal length reduces, at portions 704, close to the edges of the lenticular array 700. In FIG. 7B, the locus, $L_i$, has a flat central portion 712, with portions 714 that reduce towards the edge. The locus, $L_i$, also has flat portions 716 close to the edge. In FIG. 7C, the locus, $L_i$, has a Gaussian-type distribution, with smooth transitions from flat central portion 722 of the screen 720, to flat peripheral portions 724. In FIG. 7D, the locus, $L_i$, has a minimum 732 at the center of the screen 730, with peaks 734 on either side of the center. These examples of locus lines are not intended to be limitative or exhaustive, but are merely presented to illustrate the variation in locus line shape. The locus line shape need not be symmetrical with respect to the lenticular lens array, but may be asymmetrical.

Another embodiment of a variable power lenticular lens array is illustrated in FIG. 8, in which the lenticular lens 800 has two lenticular lens sub arrays 802 and 804. The first sub array 802 is a lenticular array of variable power, parallel lenses 812 that are useful for dispersing the light in the x-z plane. The second lenticular lens sub array 804, formed on the other side of the lenticular lens 800, is a lenticular array of the variable power, parallel lenses 822 that is crossed relative to the first sub array 802, so that light is dispersed in the y-z plane. Accordingly, the use of two, crossed variable power lenticular patterns permits light to be dispersed in two directions. The focusing power of the lenses of each variable power lenticular pattern may be designed to provide a particular asymmetric, or non-uniform light disbursement across the lenticular film 800.

FIGS. 9A to 9C illustrate different embodiments of a lenticular film that also provide additional light dispersion. The film 900 in FIG. 9A includes a variable power lenticular film 902 that is contacted, for example via lamination, adhesion, coating or the like, to a dispersing film 904. Where the dispersing film 904 is a bulk diffuser, as shown, the dispersing film 904 includes a number of particles 906 having a refractive index different from the refractive index of the continuous phase of the film 908. Random orientation, shape, and position of the particles 906 results in dispersion of light passing through the bulk diffuser 904. Such dispersion is typically symmetric, i.e. forms a cone having a circular cross-section. Another type of dispersing film 904 that may be used is a beaded film.

Another embodiment of a variable power lenticular film 920 is illustrated in FIG. 9B. In this embodiment, the lenticular film 920 itself contains diffusing particles 922 within the continuous phase 924 of the film 920. An advantage of this film 920 is that one-dimensional dispersion is provided from the lenticular face 926 and two-dimensional dispersion is provided from the bulk diffusing particles 922, resulting in an asymmetric dispersion pattern.

Another embodiment of a variable power lenticular film 940 is illustrated in FIG. 9C. In this embodiment, there is a variable power lenticular surface 942 on one surface of the film 940, while the other surface 944 is provided as another dispersing surface. The dispersing surface 944 may be any suitable dispersing surface, including, for example, a random surface diffuser, a holographic diffusing surface, or a micro-structured diffusing surface. Variable power lenticular surfaces may be used with films that provide additional light dispersion characteristics in addition to the light dispersion afforded by the lenticular surface alone.

An advantage of incorporating additional light dispersion over and above that afforded by the lenticular pattern is that this provides further control of the viewing angle. For example, consider the combination of a bulk diffuser having a dispersing angle of 30°, and a lenticular lens providing a horizontal dispersion of 20°. The combination of the bulk diffusion and the lenticular dispersion in a single film provides a horizontal viewing angle of approximately 50° and a vertical viewing angle of approximately 30°. Since the asymmetric viewing angle is provided in one film, the screen assembly is simpler and less expensive to manufacture.

Furthermore, since the dispersing film has a simple lenticular pattern on only one side, the dispersing film is easier to manufacture than where there is a lenticular pattern on each side of the film. A high quality lenticular structure is typically easier to manufacture where the radius of curvature of the lenticular pattern is lower. Where a lenticular lens film has a lenticular pattern on both the input and output sides, it is likely that the second lenticular surface is embedded in a low index material. Since the refractive index difference between the lenticular lens and the low index material is typically less than the refractive index between the lenticular lens and air, the second lenticular pattern requires higher curvatures, which are more difficult to fabricate. The combination of a single lenticular lens structure and another disperser, such as a bulk diffuser, avoids the problem of embedding a lenticular lens surface in a low index material.

In addition, light absorbing particles may be distributed within the film on which a lenticular lens array is formed. For example, if the light absorbing particles demonstrate a uniform absorption over the visible spectrum, then the absorbing particles will typically impart a gray, or neutral tint to the screen. The absorbing particles may absorb at preferred portions of the visible spectrum, so as to provide selected color properties to the film.

Figure 10A:
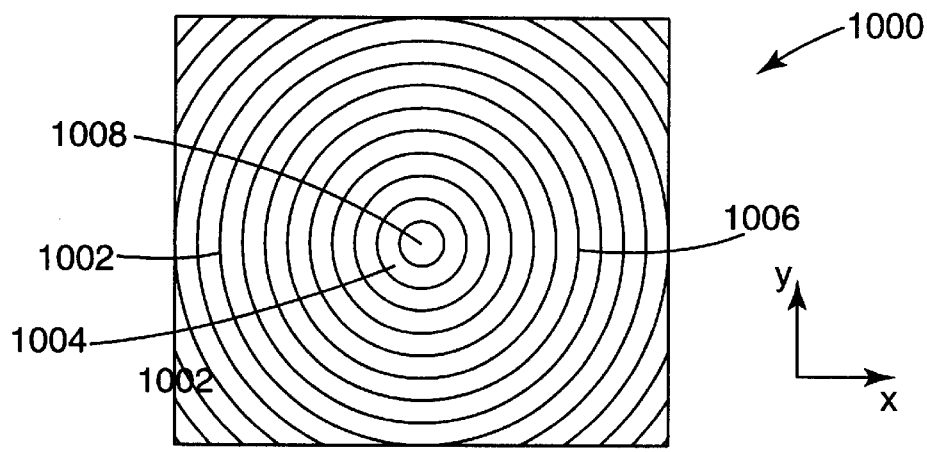
FIGS. 10A–10C illustrate two-dimensional lenticular lens patterns according to particular embodiments of the present invention.

The lenses of the lenticular lens need not extend only linearly across the surface of the lens. The lenses may be curved, or nonlinear, to form a two-dimensional lenticular pattern rather than a one-dimensional pattern obtained from straight, or linear, lenses. One particular embodiment of a variable power lenticular film is illustrated in FIG. 10A. Here the lenticular film 1000 includes a series of concentric lenticular lenses 1002, rather than the straight lenses shown in previous embodiments. An advantage of this arrangement is that the uniformity of illumination from the corners of the screen may be improved relative to that provided by crossed, straight lenticular patterns, particularly when the viewer's eyes are positioned on-axis to the screen. This lenticular lens pattern is called two-dimensional, since the lenticular lenses disperse light in both the x and y directions. In contrast, a single, straight lenticular array, for example as illustrated in FIG. 5A, disperses light only in the x direction, and is therefore termed one-dimensional. A lenticular lens 1004 close to the center of the array 1000 may have a different focusing power from a lenticular lens 1006 positioned further from the center 1008 of the array 1000. In this arrangement, the lenticular array pattern may be positioned on one side of a film, but still provides the ability to divert light from the corners of the array 1000 to a viewer who is aligned with the center 1008 of the screen, should this be desired.

The two-dimensional lenticular array pattern may be selected to produce any particular desired light dispersion pattern. For example, the lenticular array 1050 illustrated in FIG. 10B has a lenticular pattern that illustrates rotational symmetry, as a pattern in array 1000, but here the center of the rotation axes 1058 is positioned off center from the array. Accordingly, the light dispersed by this array 1050 is directed more towards a viewer who is in the (x,−y) quadrant relative to the center of the pattern 1058, rather than being aligned with the center of the array 1050. This may be useful, for example, where it is known that a viewer is situated off center from a screen, as may be the case with a wall-mounted display.

Figure 10B:
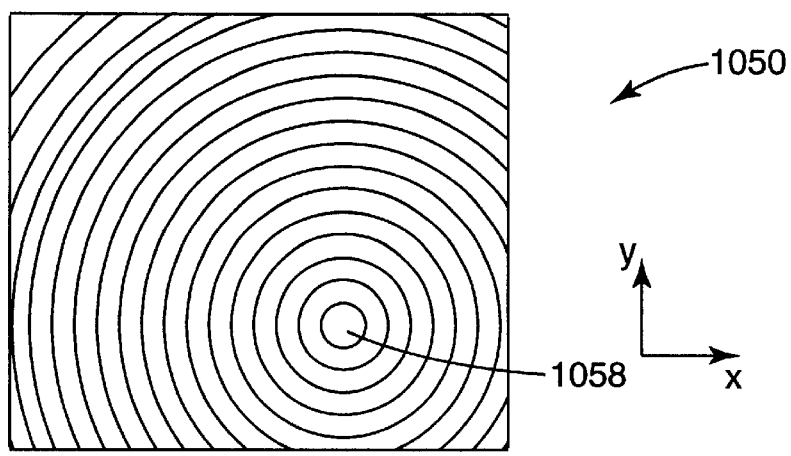
Figure 10C:
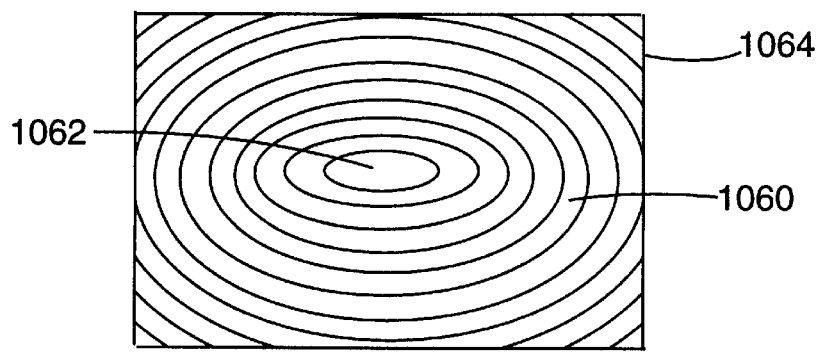

Another two dimensional array lenticular array pattern is shown in FIG. 10C. Here the lenticular pattern 1060 is elliptical, with the elliptical lenticular lenses being concentric about a point 1062 at the center of the screen 1064. Such a pattern would typically be expected to increase the vertical viewing angle for more points on the screen than the horizontal viewing angle, since the elliptical pattern lies with its major axis horizontal.

Other two-dimensional lenticular patterns may be used, and it should be understood that there is no intent to limit the two-dimensional patterns to those illustrated in FIGS. 10A and 10B. The two-dimensional lenticular patterns need not be rotationally symmetric, nor need they be symmetric in any manner.

The lenses in the lenticular array need not be arranged so that their optical axes are positioned centrally. The optical axes of a lens in a lenticular array may be offset from the center of that lens, so that in addition to dispersing light in a specific direction, the lens also redirects light. This is illustrated with reference to FIG. 11A. In this example, a lenticular array film 1100 includes a lenticular surface 1102 in which the center lens 1112 has a long focal length $f_4$. Furthermore, the optical axis 11110 is centrally positioned relative to the lens 1112. Accordingly, light rays 1114 and 1116 are focused at a position of 1118 to diverge symmetrically about the optical axes 1110 with divergence angles $\theta_3$.

Another lens in the array 1100, for example, lens 1122, having a focal length of $f_5$, may be formed so that its optical axes does not pass through the center of the lens. In such a case, the light rays 1124 and 1126 entering the lens 1122 are directed through a focus 1128 and diverged from the focus asymmetrically relative to the axes of the lens 1122. The line 1129 represents a ray passing through the center of the lens 1122. The ray 1129, after being transmitted by the array film 1100, is directed away from the optical axis 1120, in this case towards the axis 1110. The rays 1124 and 1126, after passing through the focus 1128 are dispersed asymmetrically relative to the optical axis 1120, at angles $\theta_4$ and $\theta_5$, respectively. Therefore, the variable power lenticular lens array may include lenses whose optical axes are offset relative to the lens center, so that the light is redirected macroscopically.

The cross-sectional profile of any lens in the variable power lenticular lens array may be of any desired shape. One lens 1132 of the array 1100 is shown in expanded detail in FIG. 11B. The lens surface 1134 has a circular profile, with a radius r. This type of lens surface is commonly used, but it is subject to introducing aberrations. Another possible lens surface profile 1136 is illustrated in FIG. 11C, where the surface profile 1136 is aspherical, and may be formed as a high order polynomial. Another lens surface profile 1138 is illustrated in FIG. 11D. This surface profile 1138 is asymmetric relative to the z axis 1140. Therefore, light passing through this surface profile experiences a different focusing effect depending on which portion of the lens surface the light illuminates.

Figure 12:
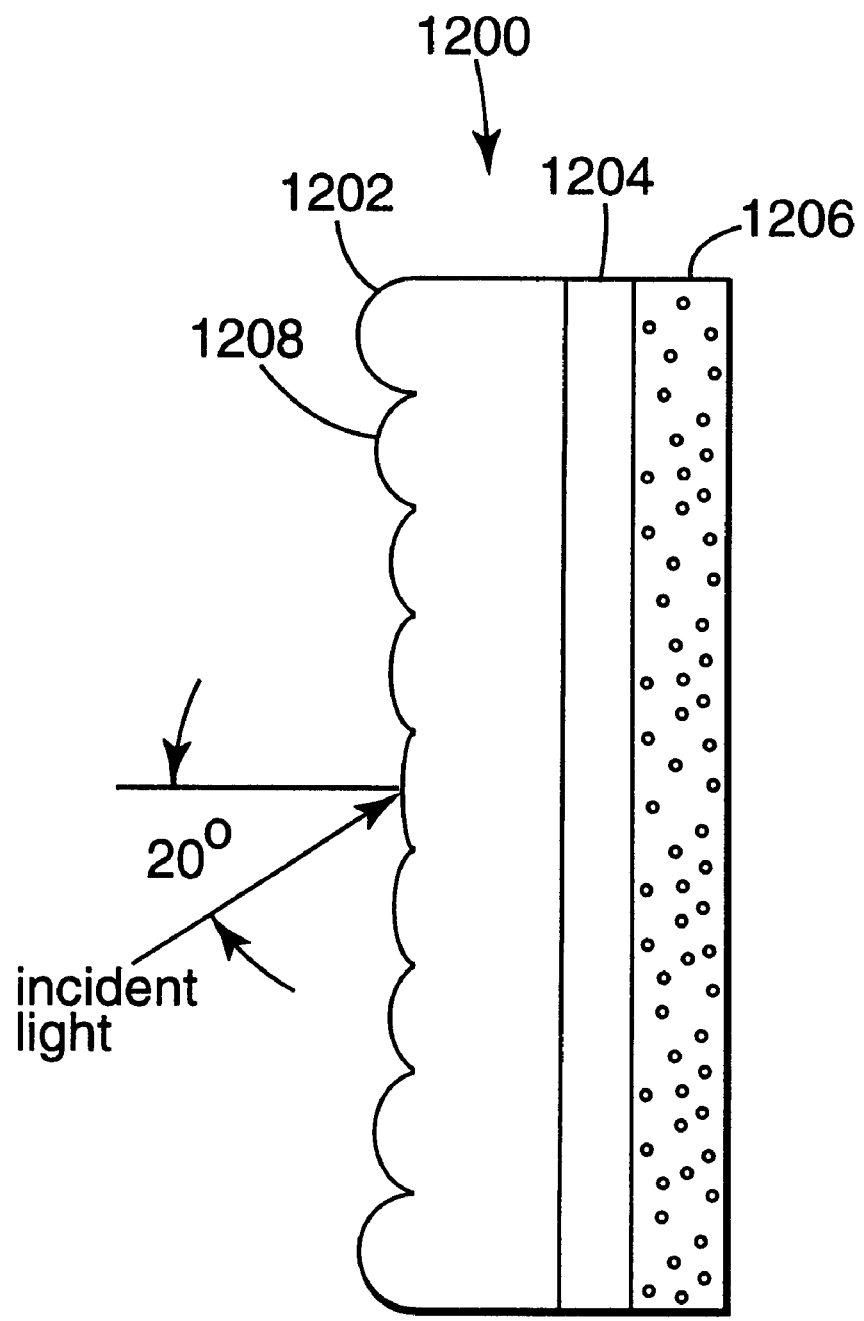
FIG. 12 illustrates the structure of a sample screen assembly in accordance with the present invention.

A one dimensional, variable power lenticular lens array screen assembly was fabricated, and the results are summarized as follows. The screen assembly 1200, illustrated schematically in FIG. 12, was formed from three layers, a lens film 1202, a substrate film 1204 and a bulk diffuser film 1206.

The lens film 1202 was formed from acrylate having a refractive index of around 1.51. The lenticular lenses were formed on a uniform pitch of 200 $\mu$m. The lenticular lenses at the center of the screen had an optical power sufficient to produce a viewing angle of 20° for plane-wave incident light. The lenticular lenses at the edges of screen, located about 7" from center, had an optical power sufficient to produce a viewing angle of about 45° for plane-wave incident light. The lens film was formed by molding on a diamond-turned master roll.

The substrate film 1204 was a layer of polycarbonate, approximately 250 $\mu$m (10 mils) thick. The bulk diffuser film 1206 had a coating thickness of approximately 270 $\mu$m (10.6 mils) and was formed using a resin with a refractive index of approximately 1.47. The resin was embedded with about 15% particles by weight. The average particle size was about 5 $\mu$m and the particle refractive index was 1.54. The screen assembly 1200 does not require the polycarbonate substrate film 1204.

The viewing angle of the screen assembly 1200, i.e. the full angle, half maximum intensity angle, was measured to be 44° (horizontal) and 42° (vertical) at the center of the screen, and 56° (horizontal) and 42° (vertical) at the edge of the screen.

Figure 13:
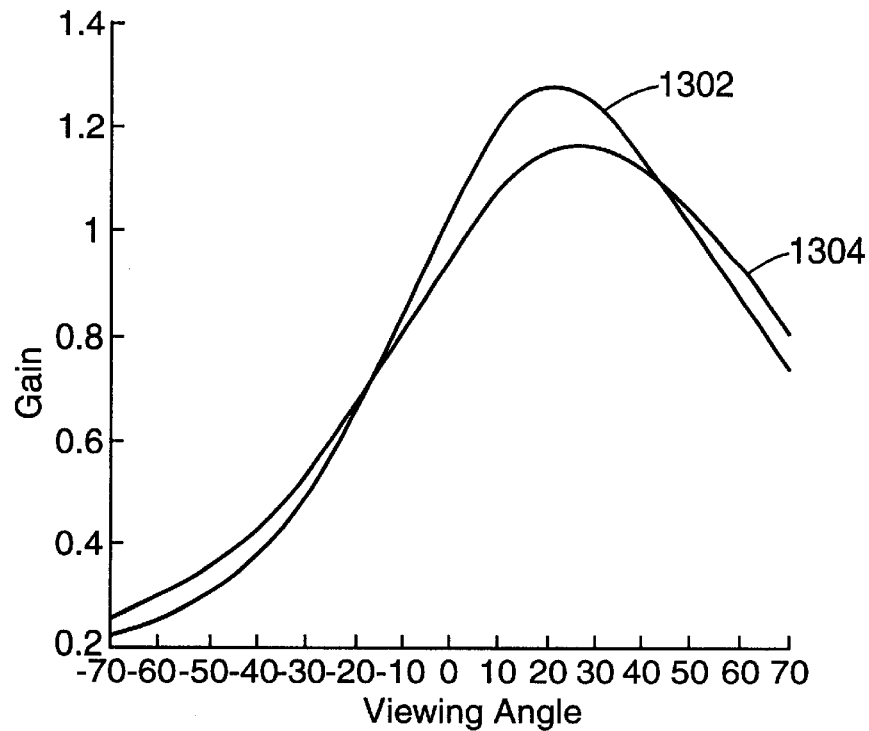
FIG. 13 illustrates gain as a function of viewing angle for points at the center and edge of the sample screen assembly.

The gain of the screen was measured for plane-wave illumination on the input surface 1208 at an angle of 20° from normal incidence: the results of the gain measurements made at the screen center and screen edge are shown in FIG. 13. The first curve 1302 is the gain measured at the center of the screen, and the second curve 1304 is the gain measured at the edge of the screen. Each curve peaks at approximately 20° or so because of the angle of the illuminating light. For angles in the range of approximately −18° to +45°, the gain measured at the center of the screen, curve 1302, is higher than the gain at the edge of the screen, curve 1304. However, where the viewing angle is less than about −180, or higher than about +45°, the gain at the edge of the screen, curve 1304, is higher than the gain at the center of the screen, curve 1302. Therefore, at these larger viewing angles, the screen is perceived as being more uniformly illuminated than if the lenticular lens film had a constant power across its width.

Figure 14:
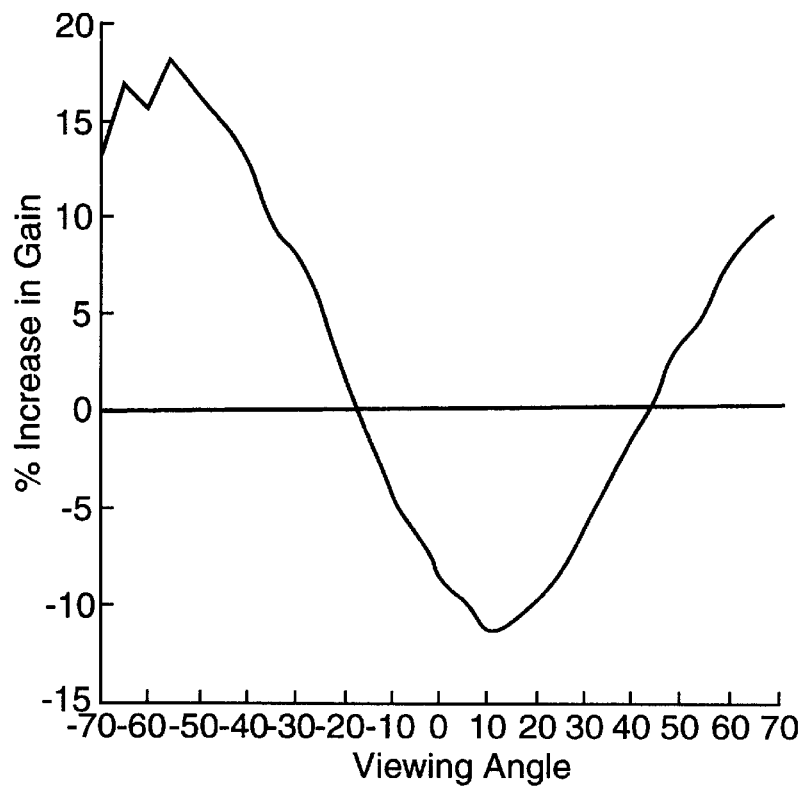
FIG. 14 illustrates fractional gain between the edge and center of the sample screen assembly.

This is further illustrated with reference to FIG. 14, which shows the percentage difference in gain for the center and edge of the screen. This is calculated for each value of viewing angle by subtracting the value for the first curve 1302 from the value of the second curve 1304, and normalizing to the value of the second curve 1304. Thus, there is a net decrease in gain for viewing angles between about −18° and +45°. This corresponds to the region where the first curve 1302 is higher than the second curve 1304. However, for viewing angles less than about −18° and greater than about +45°, then the net increase is large, approaching 15% for a viewing angle of about −55°. This shows that the variable power lenticular lens screen is useful for increasing the brightness uniformity across a screen, and may be particularly useful for situations where the user is close to the screen and is viewing some portions of the screen at a large angle.

Several different approaches to variable power lenticular screens have been described above. It will be appreciated that various combinations of these approaches may be used. For example, different two dimensional lenticular array patterns may be used with different lenticular lens profiles. Furthermore, different locus lines for the lens foci may be used with two dimensional lenticular patterns. Additional dispersion, for example using a bulk diffuser, may be used with any variable power lenticular lens array. These examples are not intended to exhaust the different combinations that may be used.

It is important to note that this invention permits the selection of the power of individual lenses in the lenticular lens array to improve the uniformity of screen intensity based on the characteristics of the light incident on the screen and the expected location of the viewer. Furthermore, the invention permits the compensation of imperfection in screen performance.

As noted above, the present invention is applicable to rear projection screens, and is believed to be particularly applicable to screens used in applications requiring an asymmetric viewing angle. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A projection screen, comprising:

a film having a first surface; and a first lenticular lens pattern on the first surface, portions of focusing elements of the first lenticular lens pattern extending nonlinearly across the first surface, adjacent focusing elements substantially paralleling one another to form a two-dimensional lenticular lens pattern; and a Fresnel lens disposed on an input side of the film.

2. A projection screen as recited in claim 1, wherein the two-dimensional lenticular pattern is selected to as to produce specific viewing angles in first and second orthogonal directions, different positions across the screen being associated with different specific viewing angles.

3. A projection screen as recited in claim 1, wherein a pitch between adjacent focusing elements is uniform across the screen.

4. A projection screen as recited in claim 1, wherein the two-dimensional lenticular lens pattern is a concentric lenticular pattern.

5. A projection screen as recited in claim 1, wherein different focusing elements of the first lenticular lens pattern have different focal lengths.

6. A projection screen as recited in claim 5, wherein the lenticular lens pattern includes at least first and second focusing elements, the first focusing element being positioned closer to a center of the lenticular lens pattern than the second focusing element, a focal length of the first focusing element being longer than a focal length of the second focusing element.

7. A projection screen as recited in claim 1, further comprising a second light dispersing element disposed to disperse light transmitted by the first lenticular lens pattern.

8. A projection screen as recited in claim 7, wherein the second light dispersing element includes a bulk diffuser mounted with the film.

9. A projection screen as recited in claim 7, wherein the second light dispersing element includes a plurality of light dispersing particles disposed within the film.

10. A projection screen as recited in claim 7, wherein the second light disperser includes a light dispersing surface on the film.

11. A projection screen as recited in claim 1, further comprising an image light source disposed to transmit image light to an input surface of the film facing the image light source via the Fresnel lens.

12. A projection screen, comprising:

first transparent light transmitting means for transmitting light; and light dispersing means disposed on at least one surface of the light transmitting means for dispersing light, the light dispersing means including at least two concentric light focusing elements extending nonlinearly across a portion of the at least one surface; and a Fresnel lens disposed on an input side of the first transparent light transmitting means.

* * * * *

UNITED STATES PATENT AND TRADEMARK OFFICE
CERTIFICATE OF CORRECTION

PATENT NO. : 6,624,934 B1
DATED : September 23, 2003
INVENTOR(S) : Moshrefzadeh, Robert S.

It is certified that error appears in the above-identified patent and that said Letters Patent is hereby corrected as shown below:

Column 2,
Line 32, after "4A" insert -- ; --.

Column 3,
Line 23, after "2B" delete "2".

Column 4,
Line 11, delete "degrees" before "or".

Column 5,
Line 29, delete "one half" and insert -- one-half --, therefore. (both occurrences)

Column 10,
Line 7, delete "11110" and insert -- 1110 --, therefore.

Column 11,
Line 16, delete "–180°" and insert -- –18° --, therefore.

Signed and Sealed this

Seventeenth Day of August, 2004

JON W. DUDAS
*Acting Director of the United States Patent and Trademark Office*